(12) United States Patent
Ahn et al.

(10) Patent No.: US 12,278,851 B2
(45) Date of Patent: Apr. 15, 2025

(54) METHOD, SYSTEM, AND NON-TRANSITORY COMPUTER-READABLE RECORD MEDIUM FOR SHARING CONTENT DURING VoIP-BASED CALL

(71) Applicant: LINE Plus Corporation, Seongnam-si (KR)

(72) Inventors: DeokYong Ahn, Seongnam-si (KR); Hwan Kim, Seongnam-si (KR); Min Jeong Kim, Seongnam-si (KR); Jaehyun Lee, Seongnam-si (KR); Seongsu Kim, Seongnam-si (KR); Kyoung Min Kim, Seongnam-si (KR); Sanghyuk Suh, Seongnam-si (KR); Jeongrok Kim, Seongnam-si (KR); Tae Jeong Lee, Seongnam-si (KR); Jeong Hyeon Kwon, Seongnam-si (KR); Keumryong Kim, Seongnam-si (KR); Na Young Kim, Seongnam-si (KR); Inah Kim, Seongnam-si (KR); Jungjun Park, Seongnam-si (KR)

(73) Assignee: LINE Plus Corporation, Gyeonggi-do (KR)

( * ) Notice: Subject to any disclaimer, the term of this patent is extended or adjusted under 35 U.S.C. 154(b) by 0 days.

(21) Appl. No.: 18/465,411

(22) Filed: Sep. 12, 2023

(65) Prior Publication Data

US 2024/0007510 A1    Jan. 4, 2024

Related U.S. Application Data

(63) Continuation of application No. 17/235,361, filed on Apr. 20, 2021, now Pat. No. 11,792,238.

(30) Foreign Application Priority Data

Apr. 22, 2020    (KR) .................... 10-2020-0048549

(51) Int. Cl.
*H04L 65/10* (2022.01)
*H04L 65/1069* (2022.01)
(Continued)

(52) U.S. Cl.
CPC ...... *H04L 65/1083* (2013.01); *H04L 65/1069* (2013.01); *H04L 65/1096* (2013.01); *H04L 65/60* (2013.01)

(58) Field of Classification Search
CPC ............. H04L 65/1083; H04L 65/1069; H04L 65/1096; H04L 65/60; H04L 65/1089;
(Continued)

(56) References Cited

U.S. PATENT DOCUMENTS 10,536,542 B1 *   1/2020   Dorner .................... H04L 51/52
10,917,618 B2 *   2/2021   Siminoff .................. H04N 5/91
(Continued)

FOREIGN PATENT DOCUMENTS

KR          100401262 B1    10/2003
KR      10-2012-0111859 A   10/2012
(Continued)

OTHER PUBLICATIONS

Shamma, David A., et al. "Enhancing online personal connections through the synchronized sharing of online video" CHI '08 extended abstracts on Human factors in computing systems. Year 2008. pp. 2931-2936 (Year: 2008).*
(Continued)

*Primary Examiner* — Lan-Huong Truong
(74) *Attorney, Agent, or Firm* — Harness, Dickey & Pierce, P.L.C.

(57) ABSTRACT

A content sharing method performed by a computer apparatus including processing circuitry, the method including providing, by the processing circuitry, an interface in response to a user input during a voice over Internet protocol
(Continued)

(VoIP) call, a user of the computer apparatus participating in the VoIP call, generating, by the processing circuitry, metadata of a VoIP call packet in response to a share request for content specified through the interface, the metadata including data corresponding to the share request, sending, by the processing circuitry, the metadata to another user participating in the VoIP call, and displaying, by the processing circuitry, a playback screen of the content with a call screen of the VoIP call, the content being shared during the VoIP call between the computer apparatus and another computer apparatus of the other user using the metadata.

20 Claims, 12 Drawing Sheets

(51) Int. Cl.
*H04L 65/1083* (2022.01)
*H04L 65/1096* (2022.01)
*H04L 65/60* (2022.01)

(58) Field of Classification Search
CPC .. H04L 65/4025; H04L 65/403; H04M 7/006; H04N 7/141
See application file for complete search history.

(56) References Cited

U.S. PATENT DOCUMENTS

| | | | |
|---|---|---|---|
| 2015/0304566 A1* | 10/2015 | Seo | H04N 23/62 |
| | | | 348/222.1 |
| 2018/0309801 A1* | 10/2018 | Rathod | H04M 3/5175 |
| 2018/0329622 A1 | 11/2018 | Missig et al. | |
| 2018/0352303 A1* | 12/2018 | Siddique | H04L 65/1069 |
| 2019/0270019 A1* | 9/2019 | Miura | H04N 21/4781 |

FOREIGN PATENT DOCUMENTS

| | | | |
|---|---|---|---|
| KR | 10-2013-0079897 A | 7/2013 | |
| KR | 10-2017-0047293 A | 5/2017 | |
| WO | WO-2009085229 A2 * | 7/2009 | ......... G06F 3/04815 |

OTHER PUBLICATIONS

Office Action dated Feb. 15, 2023 corresponding U.S. Appl. No. 17/235,361.

Notice of Allowance dated Jun. 12, 2023 corresponding U.S. Appl. No. 17/235,361.

* cited by examiner

METHOD, SYSTEM, AND NON-TRANSITORY COMPUTER-READABLE RECORD MEDIUM FOR SHARING CONTENT DURING VoIP-BASED CALL

CROSS-REFERENCE TO RELATED APPLICATION(S)

This U.S. application is a continuation of U.S. patent application Ser. No. 17/235,361, filed on Apr. 20, 2021, which claims the benefit of priority under 35 U.S.C. § 119 to Korean Patent Application No. 10-2020-0048549, filed Apr. 22, 2020, the entire contents of each of which are incorporated herein by reference in their entirety.

TECHNICAL FIELD

Some example embodiments relate to technology for providing a call function based on Internet phone, for example, voice over Internet protocol (VoIP).

BACKGROUND

Currently, a communication device provides various services, such as, for example, a wireless Internet service, and a terrestrial/satellite broadcasting service, in addition to a voice call service or a text service.

In particular, with developments in video compression technology and reconstruction technology, and commercialization of a device with a camera, a video call service that enables a call while verifying a face of a counterpart is being provided.

As an example of technology for providing a video call service, a video call service is provided between mobile phone terminals in a mobile phone network of a wireless environment.

SUMMARY

Some example embodiments may share a variety of media contents between call participants during a voice over Internet protocol (VoIP) call using a social graph.

According to an aspect of some example embodiments, there is provided a content sharing method performed by a computer apparatus including processing circuitry, the content sharing method including providing, by processing circuitry, an interface in response to a user input during a voice over Internet protocol (VoIP) call, a user of the computer apparatus participating in the VoIP call, generating, by the processing circuitry, metadata of a VoIP call packet in response to a share request for content specified through the interface, the metadata including data corresponding to the share request, sending, by the processing circuitry, the metadata to another user participating in the VoIP call, and displaying, by the processing circuitry, a playback screen of the content with a call screen of the VoIP call, the content being shared during the VoIP call between the computer apparatus and another computer apparatus of the other user using the metadata.

The interface may be based on a selected media type.

The interface may include a preview for a screen sharing target based on a selected media type including screen sharing.

The providing may include providing a content search interface corresponding to a content provider.

The content provider may be one of a plurality of content providers, and the providing of the content search interface may include providing a provider selection screen for selecting one of the plurality of content providers.

The providing of the content search interface may include recommending a keyword based on at least one of profile information set to a chatroom corresponding to the VoIP call, profile information of the user, a message or content sent through the chatroom, or statistical information corresponding to the chatroom.

The metadata may include an identifier of a selected media type and an identifier of the content, the metadata being based on a content sharing protocol corresponding to the VoIP call. The metadata may include a playback position of the content.

The metadata may include an identifier of a selected media type and a uniform resource locator (URL) corresponding to the content, the metadata being based on a content sharing protocol corresponding to the VoIP call.

The method may include generating modified metadata in response to a modification of a playback state of the content or a playback position of the content through the playback screen, and sending the modified metadata to the other user.

The sending may include sending the metadata to the other computer apparatus using a relay server or through peer to peer (P2P) communication.

The sending may include synchronizing a playback state of the content between the other computer apparatus and the computer apparatus.

The displaying may include generating a single screen including the playback screen combined with the call screen.

According to an aspect of some example embodiments, there is provided a non-transitory computer-readable record medium storing instructions that, when caused by at least one processor, cause the at least one processor to perform the content sharing method.

According to an aspect of some example embodiments, there is provided a computer apparatus including processing circuitry configured to provide an interface in response to a user input during a voice over Internet protocol (VoIP) call, a user of the computer apparatus participating in the VoIP call, generate metadata of a VoIP call packet in response to a share request for content specified through the interface, the metadata including data corresponding to the share request, send the metadata to another user that participating in the VoIP call, and display a playback screen of the content with a call screen of the VoIP call, the content being shared during the VoIP call between the user and another computer apparatus of the other user using the metadata.

Further areas of applicability will become apparent from the description provided herein. The description and specific examples in this summary are intended for purposes of illustration only and are not intended to limit the scope of the present disclosure.

DETAILED DESCRIPTION

Figure 1:
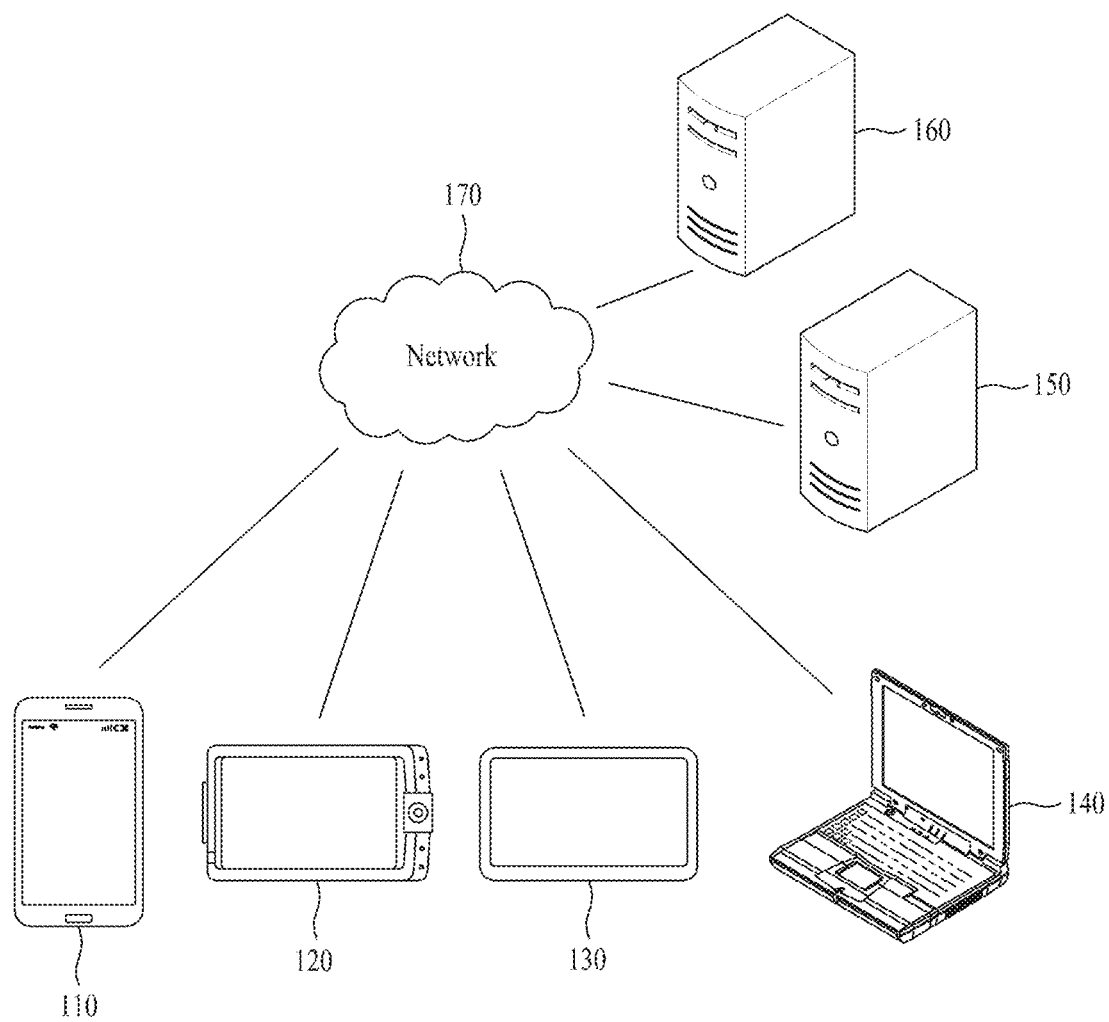
FIG. 1 is a diagram illustrating an example of a network environment according to some example embodiments.

Some example embodiments will be described in detail with reference to the accompanying drawings. Some example embodiments, however, may be embodied in various different forms, and should not be construed as being limited to only the illustrated examples. Rather, the illustrated examples are provided so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as, or a similar meaning to, that commonly understood by one of ordinary skill in the art to which some example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned herein. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, some example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of some example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

Some example embodiments relate to technology for providing a voice over Internet protocol (VoIP)-based call function.

Some example embodiments including the disclosures described herein may allow a variety of media contents to be shared between call participants during a VoIP call using a social graph.

FIG. 1 illustrates an example of a network environment according to some example embodiments. Referring to FIG. 1, the network environment may include a plurality of electronic devices 110, 120, 130, and/or 140, a plurality of servers 150 and/or 160, and/or a network 170. FIG. 1 is provided as an example only. A number of electronic devices or a number of servers is not limited thereto.

Each of the plurality of electronic devices 110, 120, 130, and/or 140 may be a fixed terminal or a mobile terminal that is configured as a computer apparatus. For example, the plurality of electronic devices 110, 120, 130, and/or 140 may be a smartphone, a mobile phone, a navigation device, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, an augmented reality (AR) device, and/or the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and/or Internet. Also, the network 170 may include at least one of network topologies that include a bus network, a star network, a ring network, a mesh network, a star-bus network, a tree or hierarchical network, and/or the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and/or 140 over the network 170. For example, the server 150 may be a system that provides a first service to the plurality of electronic devices 110, 120, 130, and/or 140 connected over the network 170. The server 160 may be a system that provides a second service to the plurality of electronic devices 110, 120, 130, and/or 140 connected over the network 170. In detail, the server 150 may provide, as the first service, a service (e.g., a VoIP call service) intended (e.g., requested and/or received) by an application through the application as a computer program installed and executed on the plurality of electronic devices 110, 120, 130, and/or 140. As another example, the server 160 may provide, as the second service, a service that distributes a file for installing and executing the application to the plurality of electronic devices 110, 120, 130, and/or 140.

Figure 2:
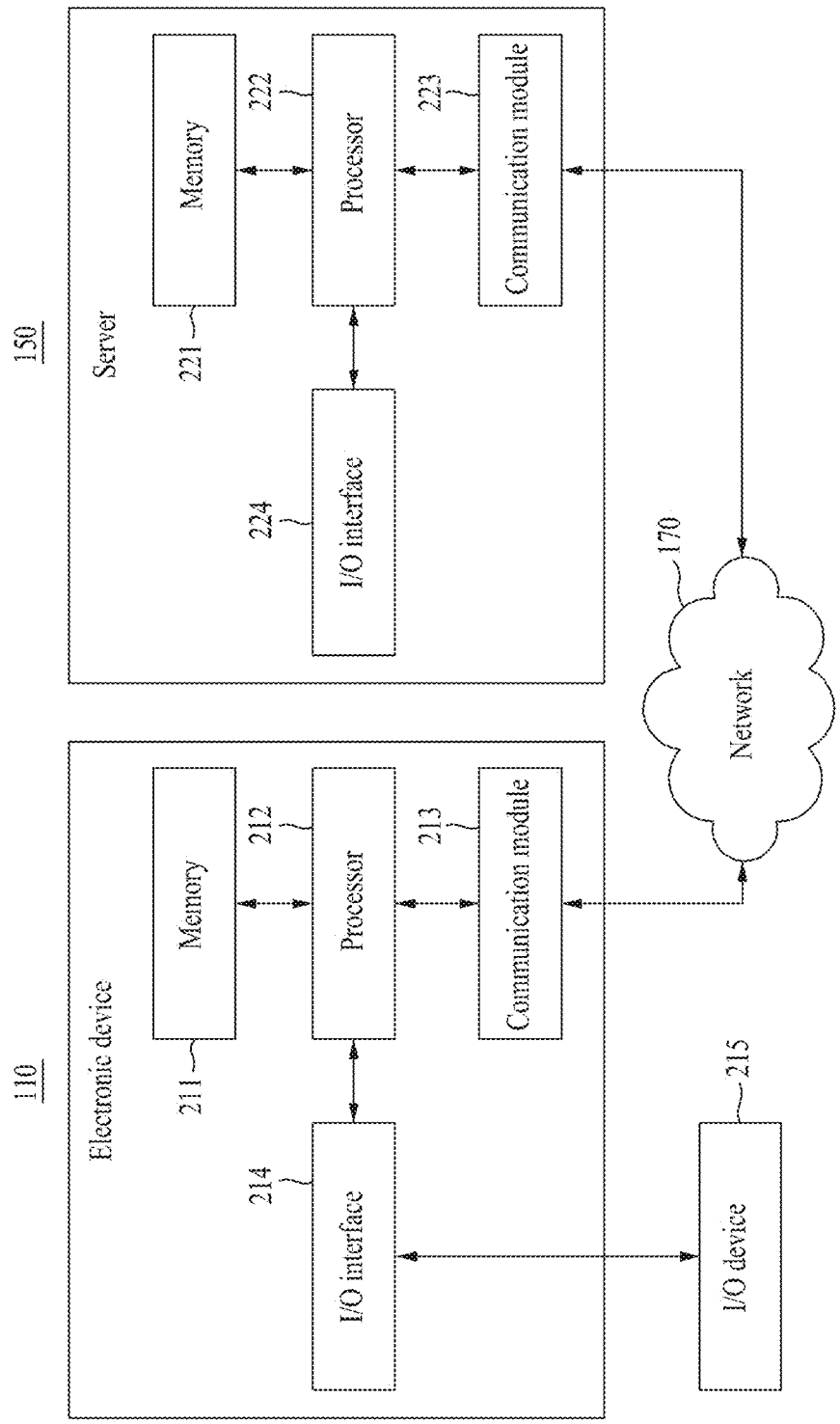
FIG. 2 is a diagram illustrating an example of an electronic device and a server according to some example embodiments.

FIG. 2 is a block diagram illustrating an example of an electronic device and a server according to some example embodiments. Description is made using the electronic device 110 as an example of an electronic device and the server 150 as an example of a server with reference to FIG. 2. Also, each of the other electronic devices 120, 130, and/or 140, and/or the server 160, may have the same configuration as, or a similar configuration to, that of the electronic device 110 or the server 150.

Referring to FIG. 2, the electronic device 110 may include a memory 211, a processor 212, a communication module 213, and/or an input/output (I/O) interface 214, and the server 150 may include a memory 221, a processor 222, a communication module 223, and/or an I/O interface 224. The memory 211, 221 may include a permanent mass storage device, such as random access memory (RAM), a read only memory (ROM), a disk drive, a solid state drive (SSD), a flash memory, etc., as a non-transitory computer-readable record medium. The permanent mass storage device, such as a ROM, an SSD, a flash memory, and/or a disk drive, may be included in the electronic device 110 and/or the server 150 as a permanent storage device separate from the memory 211, 221. Also, an OS and at least one program code, for example, a code for a browser installed and executed on the electronic device 110, or an application installed and executed on the electronic device 110 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to some example embodiments, software components may be loaded to the memory 211, 221 through the communication module 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and/or I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170, and may provide a function for communication between the electronic device 110, and/or the server 150, and another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214 may be a device used for interfacing with an I/O apparatus 215 (e.g., an input device and/or an output device). The I/O apparatus 215 may also be referred to as an I/O device 215 herein. For example, an input device may include a device, such as a keyboard, a mouse, a microphone, a camera, etc., and an output device may include a device, such as a display, a speaker, a haptic feedback device, etc. As another example, the I/O interface 214 may be a device for interfacing with an apparatus in which an input function and an output function are integrated into a single function, such as a touchscreen. The I/O apparatus 215 may be configured as (e.g., incorporated in) a single device with the electronic device 110. Also, the I/O interface 224 of the server 150 may be a device for interfacing with an apparatus (not shown), for input or output, that may be connected to the server 150 or included in the server 150. In detail, when the processor 212 of the electronic device 110 processes an instruction of a computer program loaded to the memory 211, content or a service screen configured based on data provided from the server 150 or the electronic device 120 may be displayed on the display through the I/O interface 214.

According to some example embodiments, the electronic device 110 and/or the server 150 may include a number of components greater than or less than a number of components shown in FIG. 2. However, some components according to the related art are not illustrated in detail. For example, the electronic device 110 may include at least a portion of the I/O apparatus 215, or may further include other components, for example, a transceiver, a global positioning system (GPS) module, a camera, a variety of sensors, a database (DB), and/or the like. In detail, if the electronic device 110 is a smartphone, the electronic device 110 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, some example embodiments of a method and system for sharing contents during a VoIP-based call are described.

Figure 3:
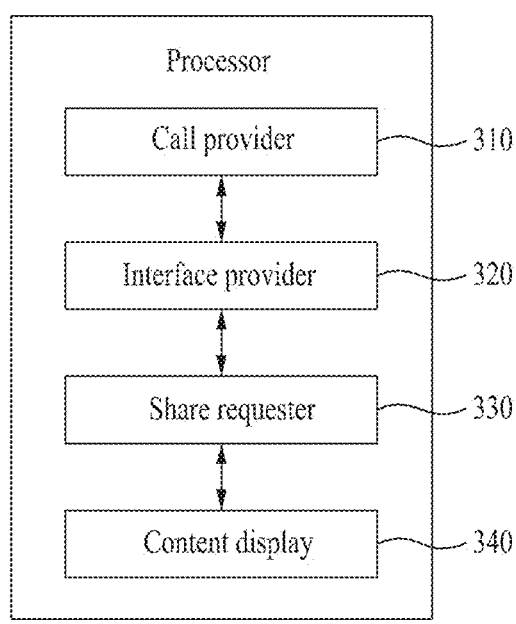
FIG. 3 is a diagram illustrating an example of components includable in a processor of an electronic device according to some example embodiments.
Figure 4:
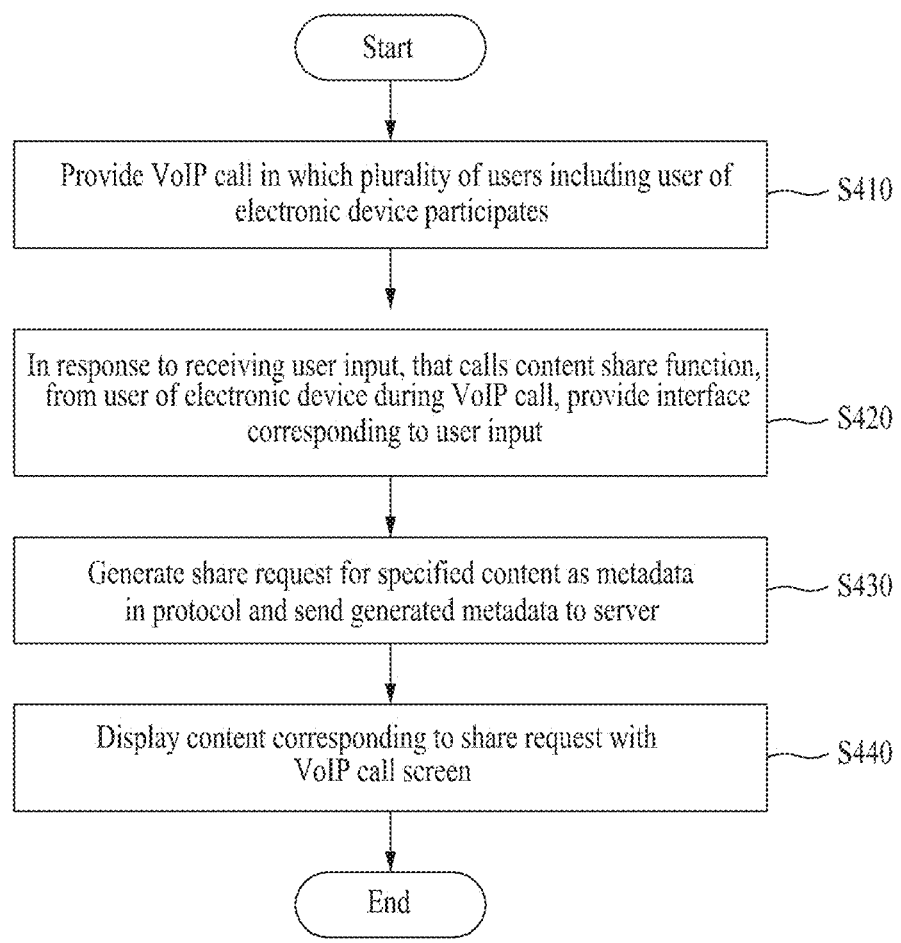
FIG. 4 is a flowchart illustrating an example of a method performed by an electronic device according to some example embodiments.

FIG. 3 is a diagram illustrating an example of components includable in a processor of an electronic device according to some example embodiments, and FIG. 4 is a flowchart illustrating an example of a method performed by an electronic device according to some example embodiments.

A VoIP call system implemented as a computer may be configured in the electronic device 110 according to some example embodiments. For example, the VoIP call system may be configured in a form of an independently operating program or may be configured in an in-app form of a specific application, for example, a messenger, to be operable on the specific application. Depending on some example embodiments, a VoIP call service may be provided through interaction with the server 150.

The VoIP call system configured in the electronic device 110 may perform the content sharing method of FIG. 4 in response to an instruction provided from an application installed on the electronic device 110.

Referring to FIG. 3, to perform the content sharing method of FIG. 4, the processor 212 of the electronic device 110 may include a call provider 310, an interface provider 320, a share requester 330, and/or a content display 340. Depending on some example embodiments, the components of the processor 212 may be selectively included in or excluded from the processor 212. Also, depending on some example embodiments, the components of the processor 212 may be separated or merged for representations of functions of the processor 212.

The processor 212, and/or the components of the processor 212, may control the electronic device 110 to perform operations S410 to S440 included in the content sharing method of FIG. 4. For example, the processor 212, and/or the components of the processor 212, may be configured to execute an instruction according to a code of at least one program and a code of an OS included in the memory 211.

Here, the components of the processor 212 may be representations of different functions of the processor 212 performed by the processor 212 in response to an instruction provided from the program code stored in the electronic device 110, for example, an instruction provided from the application executed on the electronic device 110. For example, the call provider 310 may be used as a functional representation of the processor 212 that controls the electronic device 110 to provide a VoIP call in response to the instruction.

The processor 212 may read an instruction from the memory 211 to which instructions associated with control of the electronic device 110 are loaded. In this case, the read instruction may include an instruction for controlling the processor 212 to perform the following operations S410 to S440.

Referring to FIG. 4, in operation S410, the call provider 310 may provide a VoIP call in which at least two users including a user of the electronic device 110 participate. The VoIP call may include a voice call function and/or a video call function. Here, the VoIP call may support a group call including a number of users less than a maximum, or upper limit, preset or alternatively, given number of users as well as a one-to-one call. For example, in response to a request for a VoIP call between users of the electronic device 110, 120, 130, and 140, it is possible to transfer a call request to an electronic device of a counterpart and thereby, to connect a VoIP-based call channel to users that accept to participate in a corresponding call. According to some example embodiments, each participant to the VoIP call (e.g., the electronic device 110, the electronic device 120, the electronic device 130, and/or the electronic device 140) may generate a picture and/or video by capturing an image (e.g., sensing light from the environment and generating a digital image based on the sensed light). The pictures and/or videos generated by each respective participant to the VoIP call (e.g., generated using a camera included in, for example, the electronic device 110) may be sent to the other participants of the VoIP call. The pictures and/or videos generated by each respective participant (e.g., other participants) to the VoIP call may be displayed in a call screen corresponding to the VoIP call.

In the case of a video call, the call provider 310 may transfer, to the server 150, an indication of an intent of the user of the electronic device 110 to participate in the call and may receive, from the server 150, one or more videos of participant of the VoIP call as an individual video, may render the received participant videos into a single screen and may configure a video call screen. Instead of generating a single video that includes a plurality of participant videos on the side of the server 150 and providing the generated single video to the electronic device 110, the server 150 may send each of the participant videos to the electronic device 110 as an individual video and the electronic device 110 may configure the plurality of participant videos into a video call screen on a single screen. According to some example embodiments, the plurality of participant videos may correspond to videos generated by each respective participant to the VoIP call.

In the case of a voice call, the call provider 310 may generate a list of participants based on profile information with respect to users that accept to participate in the call, and may configure a video and/or voice call screen that includes the list of participants. According to some example embodiments, the voice call screen includes pictures generated by each respective participant to the VoIP call.

In operation S420, in response to receiving a user input, that calls a content share function, from the user of the electronic device 110 during the VoIP call, the interface provider 320 may provide (e.g., generate and/or output to a display of the electronic device 110) a graphical user interface (GUI) for specifying content desired to be shared with a participant in a call. The user input may include a media type selected as a content sharing medium. For example, the media type may include a screen share, and/or a content provider that provides a content sharing service such as YouTube, and the like. The content share function may be a function of sharing media content through screen sharing or the content sharing service between call participants during the VoIP call. The interface provider 320 may provide a GUI corresponding to a media type by the user input as an interface for specifying content to be shared with a call participant on a VoIP call screen.

For example, in the case of sharing content of the content provider as one of several media types, the interface provider 320 may provide a GUI for a content search. The interface provider 320 may provide a provider selection screen for selecting a content provider and, in response to a selection on (e.g., of) the content provider through the provider section screen, may provide a GUI capable of (e.g., configured to facilitate) searching for content in (e.g., on) a platform of the content provider. That is, the interface provider 320 may provide a list of content providers that provide the content sharing service and may provide an interface capable of searching (e.g., configured to facilitate a search) for content of a content provider selected from the list of content providers. The user may select a specific content provider as a media type and then may specify content that the user desires to share with a call participant through the content search within the platform of the corresponding content provider. According to some example embodiments, the interface provider 320 may provide a GUI for the content search that corresponds to the content provider selected via the provider selection screen. According to some example embodiments, the provider selection screen may include a list of available content providers and may be configured to receive a user input selecting one of the content providers from the list of available content providers.

As another example, in the case of sharing content through screen sharing as one of several media types, the interface provider 320 may provide a GUI that includes a preview for a screen sharing target. In the case of sharing content of a content provider through a URL, the interface provider 320 may provide a GUI that includes a preview for content of the corresponding URL. In the case of entering the VoIP call screen in a state in which a content URL of the content provider is copied on a clipboard, the interface provider 320 may recognize the entry as an instruction to call the content share function. Here, in response to recognizing the instruction to call the content share function, the interface provider 320 may provide a GUI that includes a preview for the URL copied to the clipboard. The user may verify a screen sharing target or media content of the URL through the preview, and then may specify the verified media content as content to be shared with the call participant.

In providing a GUI for a content search, the interface provider 320 may recommend a keyword for the content search based on profile information set to a chatroom (e.g., a chatroom corresponding to a VoIP call) or previously shared data in the corresponding chatroom during the VoIP call. Here, the profile information may include topic information of the chatroom. The interface provider 320 may recommend a keyword based on profile information of a user that participates in the chatroom, such as, for example, an age, a gender, and/or a residential area. In addition to the profile information, a matter (e.g., topic) of interest may be derived by analyzing previous shared data, for example, messages or contents sent through the chatroom, and a keyword related to the derived matter of interest may be provided as a recommend keyword. For example, if at least a desired ratio of messages for corona virus are present in the chatroom, the interface provider 320 may recommend a keyword related to corona virus. If statistical information, for example, recent news about the chatroom is shared a large number of times, the interface provider 320 may recommend a keyword related to the corresponding news. Also, if a video of a LINE Friends channel is shared most based on a content sharing history of the chatroom, for example, using LINE LIVE during the VoIP call, the interface provider 320 may recommend a real-time popular keyword of LINE LIVE or a keyword related to the LINE Friends channel. In the case of an open chatroom in which a plurality of users gathers and exchanges content on a specific topic on a messenger platform, the interface provider 320 may recommend a keyword based on topic information set to the open chatroom.

In operation S430, in response to receiving a share request for specified content through the GUI from the user of the electronic device 110, the share requester 330 may generate the share request for the specified content as metadata in a protocol of the VoIP call channel, and may send the generated metadata to the server 150. That is, the share requester 330 may generate metadata of a VoIP call packet that includes data corresponding to the content share request and may send the generated metadata to the server 150.

A content sharing protocol for data exchange in a VoIP call state may be defined in advance based on a media type. For example, the content sharing protocol may include an identifier that represents a content share function and metadata defined based on a media type. Start and unset for content sharing may be processed through an event of a core. When the media type is a content provider, an identifier of the media type, an identifier a title, a thumbnail, a playback state (playing, pause, etc.), and/or a playback position, of user specified content, and/or the like may be added to the metadata of the VoIP call packet. In the case of sharing content of the content provider through the URL, an identifier of the media type, a URL (e.g., a URL identifying the content and/or a location of the content), a playback state, and/or a playback position of the URL (e.g., of the content of which the URL indicates) may be added to the metadata of the VoIP call packet. When the media type is a screen share, an identifier of the media type, data used for screen sharing, and/or the like, may be added to the metadata of the VoIP call packet. The share requester 330 may describe all information used to synchronize content specified through the GUI (preview or search result) between the user of the electronic device 110 and the call participant as metadata of VoIP, and may send the same (e.g., the information) to the server 150.

In operation S440, the content display 340 may display content, corresponding to the share request from the user of the electronic device 110, with the VoIP call screen. When the share request for the content specified through the GUI is transferred from the user of the electronic device 110 to the server 150, the content display 340 may display a playback screen (hereinafter, referred to as a "content screen") of the corresponding content with the VoIP call screen. For example, the content display 340 may include the content screen in the VoIP call screen through interaction with the call provider 310, and may adjust and display the playback screen as a single screen combined with the VoIP call screen. As another example, the content display 340 may display the content screen to be overlaid on the VoIP call screen as an individual screen, such as picture-in-picture (PIP).

Figure 5:
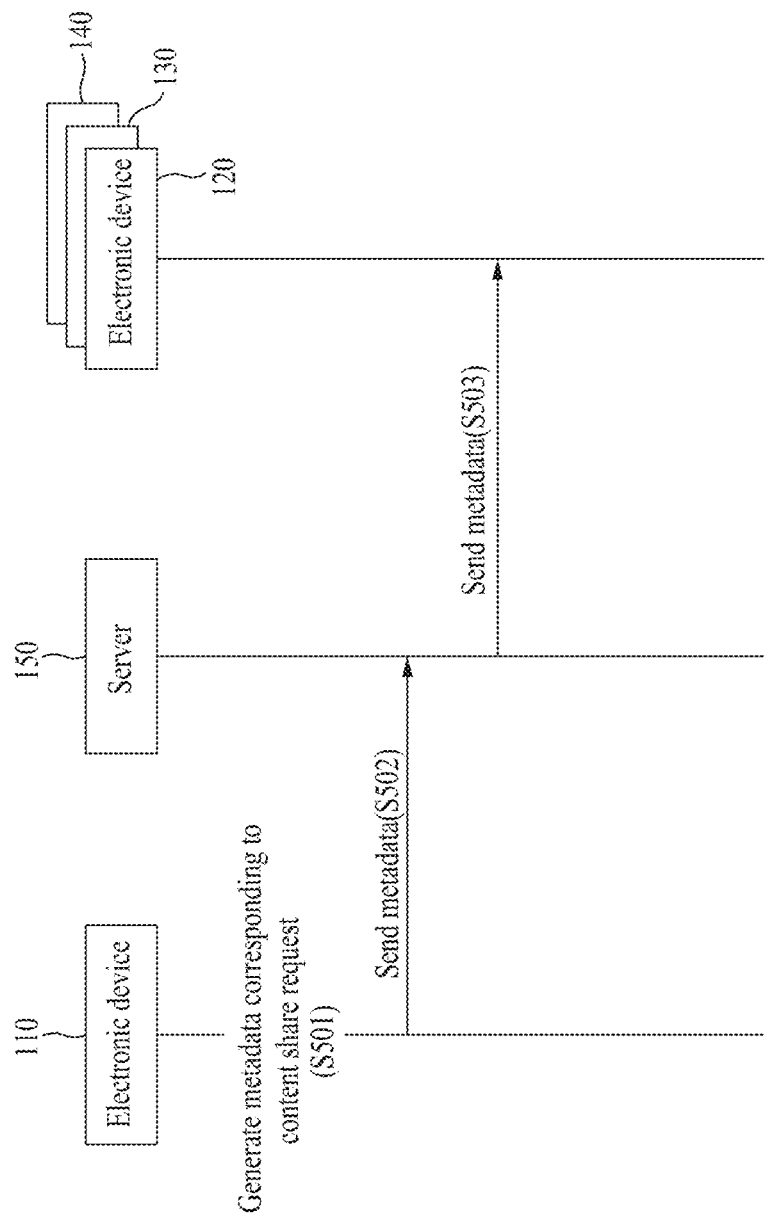
FIG. 5 illustrates an example of a content sharing process according to some example embodiments.

FIG. 5 illustrates an example of a content sharing process according to some example embodiments.

Referring to FIG. 5, in operation S501, in response to receiving a content share request from the user during a VoIP call, the electronic device 110 may generate metadata of a VoIP call packet that includes data corresponding to the content share request.

In operation S502, the electronic device 110 may send, to the server 150, the metadata of the VoIP call packet that includes data corresponding to the content share request of the user.

The server 150 may recognize a media type and content to be shared based on the metadata of the VoIP call packet, may determine the electronic device 110 that requests content share among call participants as a sender, and may determine at least one of the electronic devices 120, 130, and/or 140 of the remaining participants as a receiver.

In operation S503, the server 150 may transfer the metadata of the VoIP call packet, that includes data corresponding to the content share request of the sender, to at least one of the electronic devices 120, 130, and/or 140 corresponding to the receiver.

The server 150 may perform relay functionality of transferring the metadata of the VoIP call packet between the sender and the receiver for sharing the content as is.

At least one of the electronic devices 120, 130, and/or 140 corresponding to the receiver may share the content in the same state as, or a similar state to, that of the sender based on the metadata of the VoIP call packet received from the sender through the server 150. When a video is to be shared, the sender may include only information about the video (e.g., URL information, or a content identifier, and information about a start point in time) in the metadata or may include the information in a video packet and transfer the same to the receiver. The receiver may load the video from the content provider based on information included in the metadata or may start to play back the video included in the VoIP call packet received from the sender in a playback state of the sender as is without performing an additional loading operation. In the case of a request for sharing a playback list, the receiver may receive a state of the sender through the metadata of the VoIP call packet, and may start to play back the video by directly referring to video information included in the playback list and filling the corresponding information.

For a VoIP call, a relay server, for example, the server 150 to transfer the VoIP call packet may be used. However, it is provided as an example only. P2P communication may be used without using the server 150.

Figure 6:
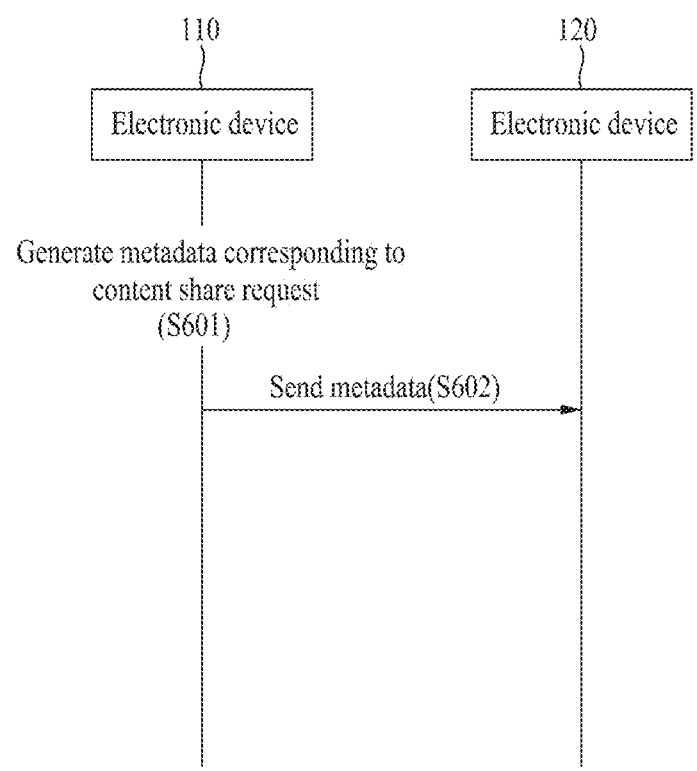
FIG. 6 illustrates another example of a content sharing process according to some example embodiments.

FIG. 6 illustrates another example of a content sharing process according to some example embodiments. FIG. 6 illustrates an example of a one-to-one VoIP call process.

Referring to FIG. 6, in operation S601, in response to receiving a content share request from the user of the electronic device 110 during the one-to-one VoIP call with the electronic device 120, the electronic device 110 may generate metadata of a VoIP call packet that includes data corresponding to the content share request.

In operation S602, the electronic device 110 may directly transfer, to the electronic device 120 corresponding to a receiver, the metadata of the VoIP call packet that includes data corresponding to the content share request of the user through P2P of one-to-one communication.

Therefore, the VoIP call packet may be sent and received between a sender and a receiver through P2P without using the server 150. Content may be shared during the VoIP call using the metadata of the VoIP call packet.

Basically, the sender may have a right (e.g., ability) to manipulate content shared with the receiver. When a user of a sender side modifies a playback position or a playback state, metadata of a VoIP call packet that includes modified data may be transferred to the receiver to synchronize a state of the content being shared between the sender and the receiver according to a manipulation of the sender. The metadata including modified data may also be referred to as modified metadata herein.

As another example, the receiver may receive a state of content being shared, or propose sharing of another content, based on consent from the sender and/or another call participant.

FIGS. 7 to 12 illustrate examples of a process of sharing content during a VoIP call according to some example embodiments.

FIGS. 7 to 10 illustrate examples of an interface screen displayed on a display of the electronic device 110 corresponding to a sender.

Figure 7:
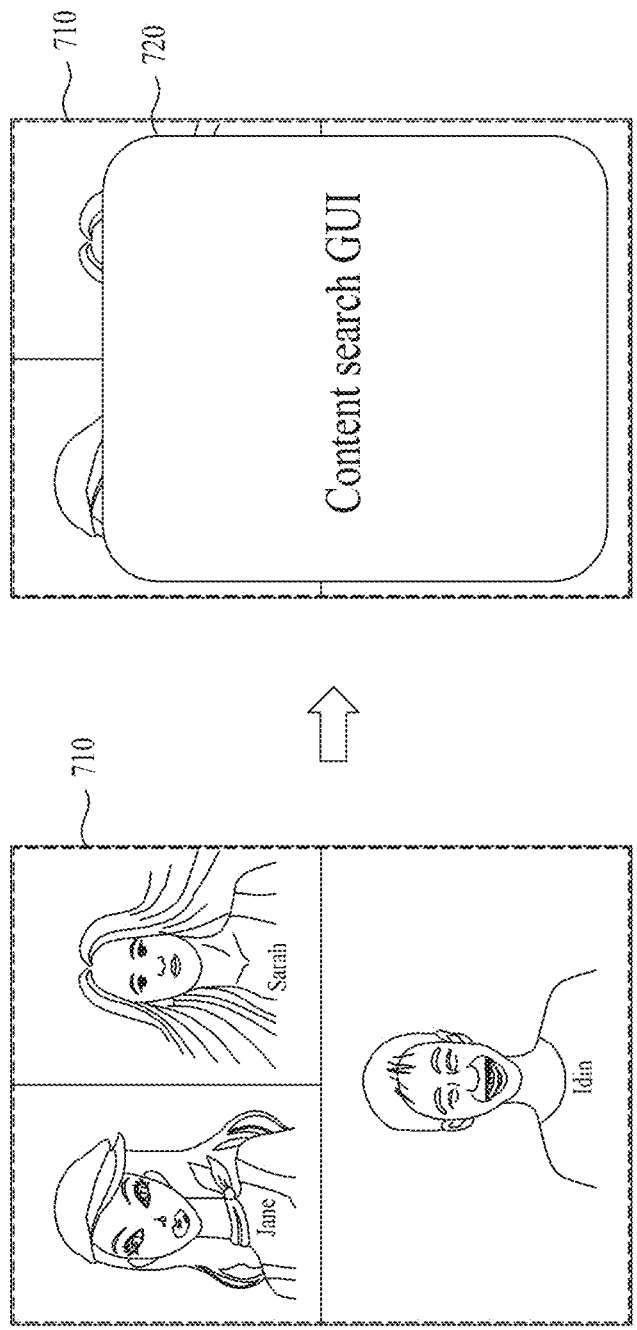
FIGS. 7 to 12 illustrate examples of a process of sharing content during a voice over Internet protocol (VoIP) call according to some example embodiments.

Referring to FIG. 7, the processor 212 may receive each of several participant videos of a VoIP call as an individual video, and may render the received participant videos into a single screen and then display a video call screen 710. In response to receiving a user input for calling a content share function from the user of the electronic device 110 during the VoIP call, the processor 212 may provide a GUI for specifying content desired to be shared with a participant in a call.

The video call screen 710 may be adjusted based on an environmental setting by the user and/or a number of participants. For example, the video call screen 710 may be configured such that all participant videos are displayed on a single screen, or participant videos are aligned in one direction and then swiped in an alignment direction. According to some example embodiments, participant videos up to a threshold number of videos may be displayed on the video call screen 710, and participant videos in excess of the threshold number may be displayed in response to a swipe gesture input.

Referring to FIG. 7, when the user desires to share content of the content provider, such as YouTube, as one of several media types, the processor 212 may provide a content search GUI 720. When a plurality of content providers is linkable, the processor 212 may provide a provider selection screen for selecting a content provider. In response to a selection on (e.g., of) a content provider through the provider selection screen, the processor 212 may provide the content search GUI 720 capable of searching (e.g., facilitate a search) for content in a platform of the selected content provider.

Figure 8:
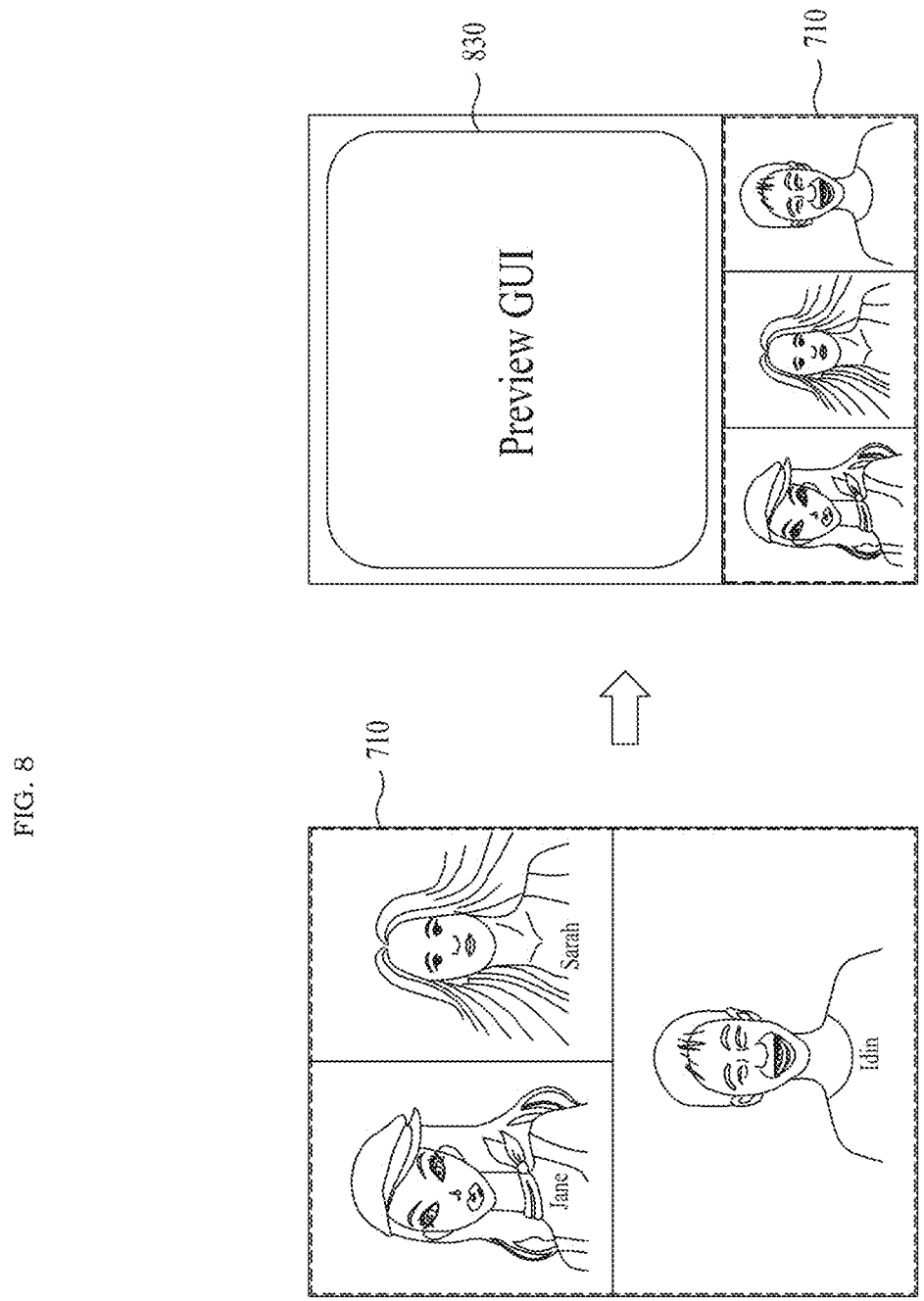

Referring to FIG. 8, when the user desires to share content through screen sharing as another media type, the processor 212 may provide a preview GUI 830 that includes a preview for a screen specified as a screen sharing target among screens executed on the electronic device 110.

The processor 212 may display the content search GUI 720 and/or the preview GUI 830 to be overlaid (e.g., as an overlay, pop-up, etc.) on the video call screen 710 as GUIs for specifying content (see FIG. 7), or may adjust the video call screen 710 and display the content search GUI 720 and the preview GUI 830 as a single screen combined with the video call screen 710 (see FIG. 8), as a GUI for specifying content.

Figure 9:
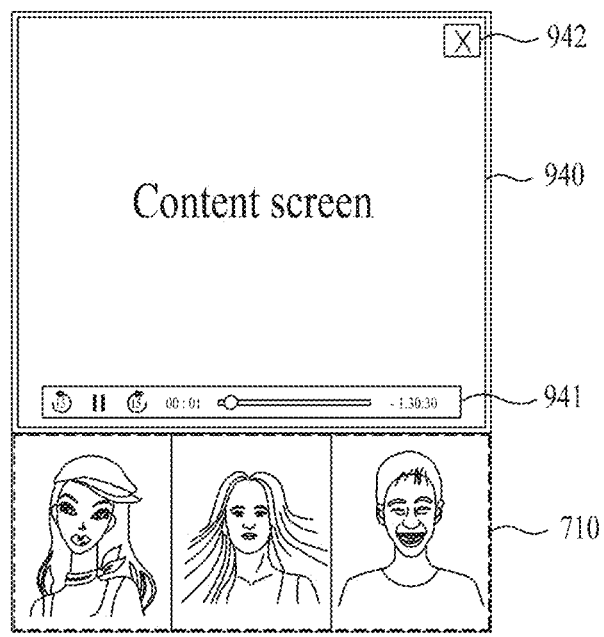

When the user specifies content through the content search GUI 720 or the preview GUI 830, and requests sharing of the specified content, the processor 212 may transfer, to a receiver, metadata of a VoIP call packet that includes data for the corresponding content sharing. Referring to FIG. 9, the processor 212 may display the video call screen 710 and a content screen 940 that is a playback screen of content requested to be shared.

In the case of displaying the content screen 940 on a single screen combined with the video call screen 710, the video call screen 710 may display participant videos on a remaining area excluding the content screen 940. Here, the video call screen 710 may be configured to display all of the participant videos or may be configured to align participant videos in one direction and to be swiped in an alignment direction. According to some example embodiments, participant videos up to a threshold number of videos may be displayed on the video call screen 710, and participant videos in excess of the threshold number may be displayed in response to a swipe gesture input.

Referring to FIG. 9, an interface 941 capable of performing a content manipulation, such as, for example, a change in a playback position, pause, and/or resume, may be displayed on the content screen 940 of the electronic device 110 of the sender side. A close button 942 for terminating a content share function may be included in the content screen 940.

Figure 10:
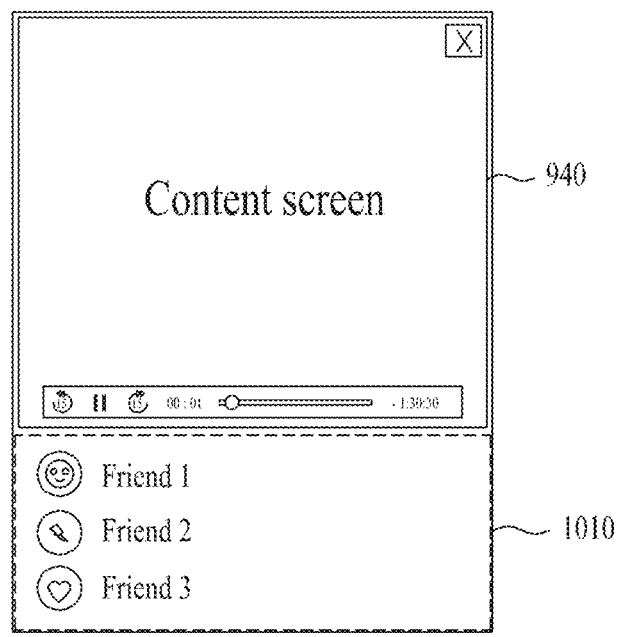

Referring to FIG. 10, in the case of a voice call in addition to a video call, the processor 212 may provide a voice call screen 1010 that includes a list of participants participating in a call as a VoIP call screen. In the case of sharing content during the voice call, the processor 212 may display the content screen 940 with the voice call screen 1010 that includes the list of participants.

Figure 11:
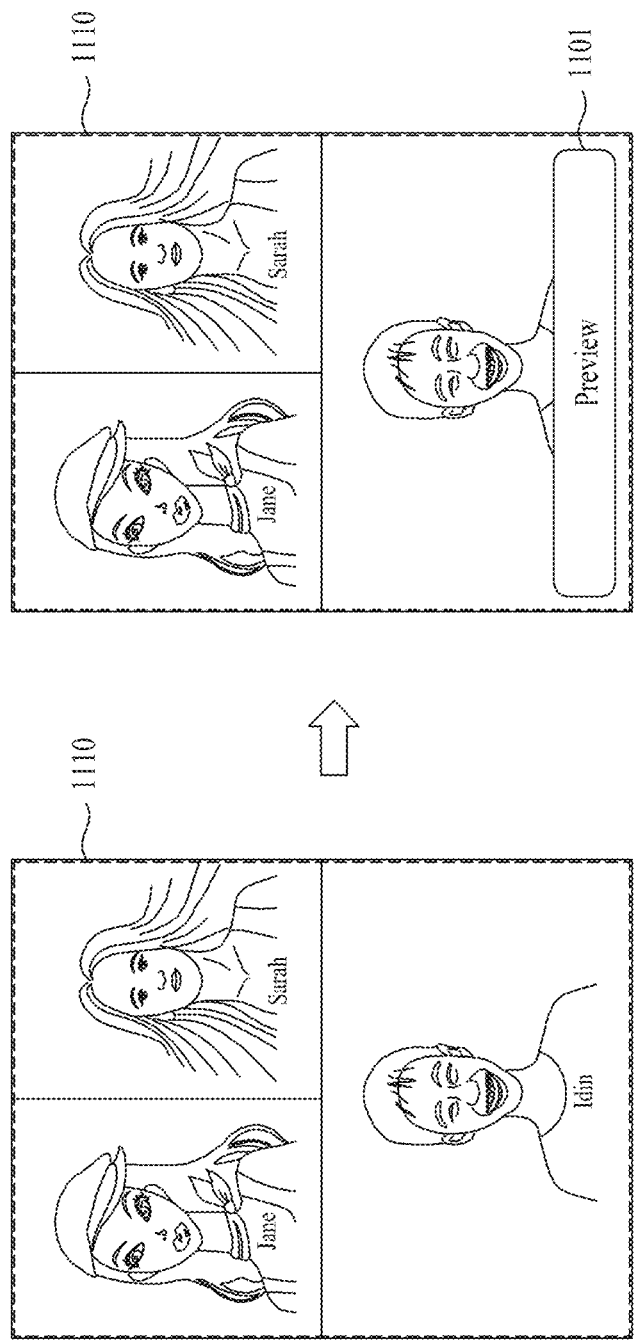
Figure 12:
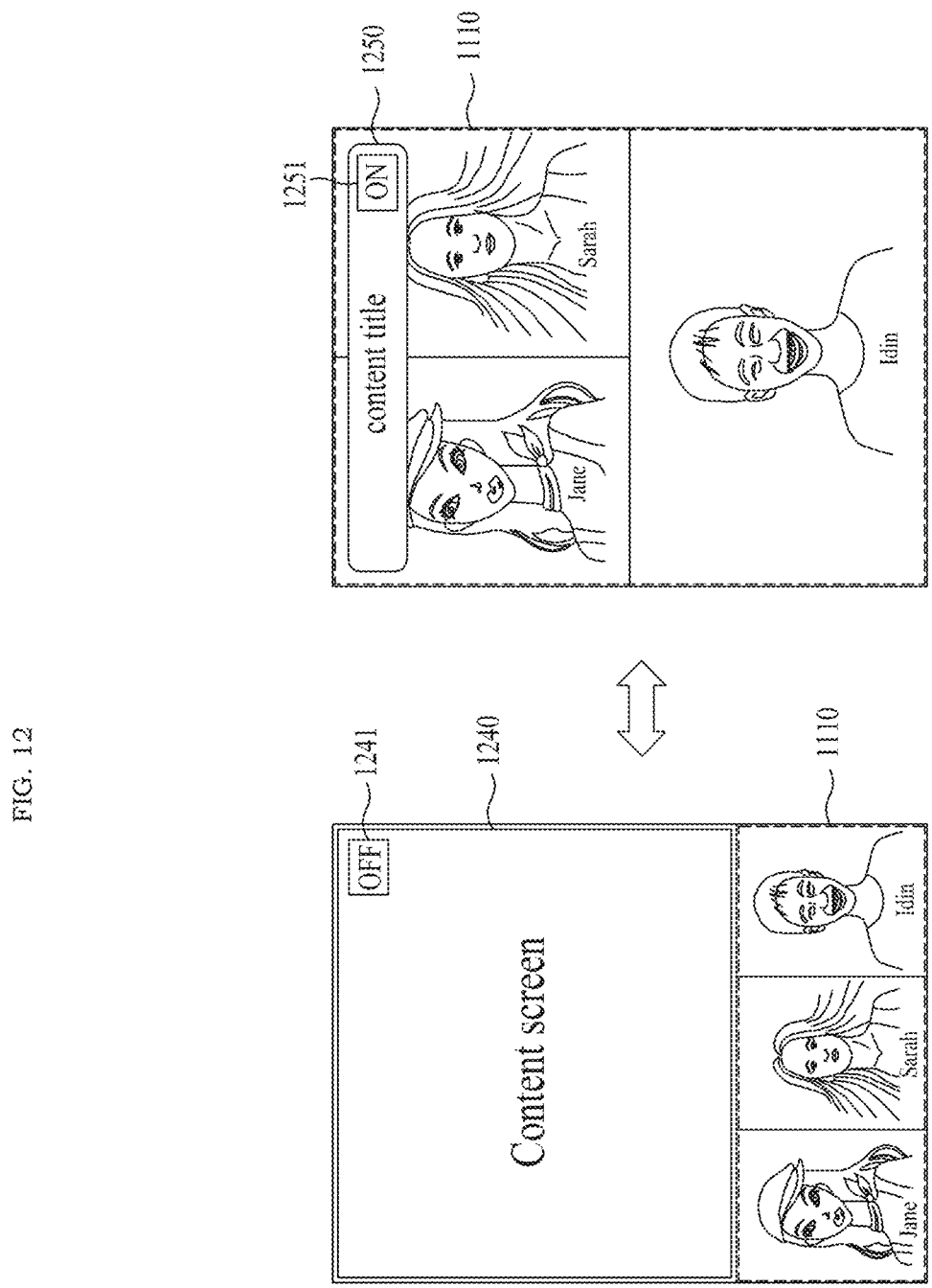

FIGS. 11 and 12 illustrate examples of an interface screen displayed on at least one electronic device, for example, the electronic device 120, among the electronic devices 120, 130, and 140 that are receivers.

Referring to FIG. 11, a processor (e.g., the processor 212) of the electronic device 120 may receive each of several participant videos of a VoIP call as an individual video, and may render the received participant videos as a single screen to display a video call screen 1110.

In response to receiving metadata of a VoIP call packet for content sharing from a sender during the VoIP call with the sender, the processor of the electronic device 120 may display a preview screen 1101 about content the sender desires to share on the video call screen 1110 based on the received metadata of the VoIP call packet. Instead of displaying the preview screen 1101, the processor may display a notice about a content share request of the sender, or may simultaneously, or contemporaneously, display the preview screen 1101 and the notice on the video call screen 1110.

When a user of the electronic device 120 accepts content sharing through the preview screen 1101 or the notice, the video call screen 1110 and a content screen 1240 of a target to be shared may be displayed.

Referring to FIG. 12, an interface for ON/OFF (opening/folding) of the content screen 1240 may be included on the content screen 1240 of the electronic device 120 that is a receiver. The interface for ON/OFF (opening/folding of the content screen 1240 may not be an interface for performing content manipulation. For example, the content screen 1240 may include a button 1241 for turning OFF the content screen 1240 in an unfolded state, that is, an open state. Referring to FIG. 12, in response to an input of OFF on the button 1241 from the user of the electronic device 120, the content screen 1240 may be switched to a minimization screen 1250 that includes content information, for example, a content title, being shared and may display the switched minimization screen 1250 on the video call screen 1110. Here, the video call screen 1110 may be switched to a previous screen before being combined with the content screen 1240. The minimization screen 1250 may include a button 1251 for turning ON the content screen 1240 to be in an open state.

According to some example embodiments, a variety of media contents may be shared between call participants during a VoIP call, for example, a voice call or a video call, using a social graph.

According to some example embodiments, operations described herein as being performed by the electronic device 110, the electronic device 120, the electronic device 130, the electronic device 140, the server 150, the server 160, the processor 212, the processor 222, the call provider 310, the interface provider 320, the share requester 330 and/or the content display 340 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The systems and/or apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The above-described methods according to some example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

While this disclosure includes some example embodiments, it will be apparent to one of ordinary skill in the art that various alterations and modifications in form and details may be made without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A content sharing method performed by a computer apparatus including processing circuitry, the content sharing method comprising:
providing, by the processing circuitry, a content search interface on a call screen of a voice over Internet protocol (VoIP) call in response to a user input during the VoIP call, a user of the computer apparatus participating in the VoIP call;
sending, by the processing circuitry, information on specified content to a server in response to a share request for the content specified by the user of the computer apparatus among contents found through the content search interface; and
displaying, by the processing circuitry, the specified content with the call screen of the VoIP call.

2. The content sharing method of claim 1, wherein the providing comprises providing a recommend keyword through the content search interface.

3. The content sharing method of claim 2, wherein the providing the recommend keyword comprises providing the recommend keyword based on at least one of profile information set to a chatroom corresponding to the VoIP call, information on the user participating in the chatroom, a message or content sent through the chatroom, statistical information corresponding to the chatroom, and a content sharing history of the chatroom.

4. The content sharing method of claim 1, wherein the providing comprises displaying the content search interface and an interface for providing a preview related to the content to be overlaid on the call screen of the VoIP call.

5. The content sharing method of claim 1, wherein the providing comprises providing the content search interface for searching for content in a platform of a content provider on the call screen of the VoIP call in response to a selection on the content provider providing a content sharing service as a media type corresponding to a content sharing medium by the user input.

6. The content sharing method of claim 1, further comprising:
providing, by the processing circuitry, an interface including a preview for a screen sharing target on the call screen of the VoIP call in response to a selection on a screen share as a media type corresponding to a content sharing medium by the user input.

7. The content sharing method of claim 1, wherein the displaying comprises displaying a playback screen of the specified content with the call screen of the VoIP call and displaying the playback screen as a single screen combined with the call screen of the VoIP call.

8. The content sharing method of claim 1, wherein the sending comprises generating metadata of a VoIP call packet of the VoIP call including information on the specified content as data corresponding to the share request.

9. The content sharing method of claim 8, wherein the generating comprises generating the metadata including an identifier of a media type selected as a content sharing medium according to a content sharing protocol corresponding to the VoIP call and an identifier or a uniform resource locator (URL) for the specified content.

10. The content sharing method of claim 8, wherein the sending comprises sending the generated metadata to the server.

11. The content sharing method of claim 1, further comprising:
generating, by the processing circuitry, metadata of a VoIP call packet including modified data in response to a modification of a playback state or a playback position of the specified content by a manipulation of the user through a playback screen of the specified content.

12. A non-transitory computer-readable record medium storing instructions that, when caused by at least one processor, cause the at least one processor to perform the content sharing method of claim 1.

13. A computer apparatus comprising:
processing circuitry configured to
provide a content search interface on a call screen of a voice over Internet protocol (VoIP) call in response to a user input during the VoIP call, a user of the computer apparatus participating in the VoIP call,
send information on specified content to a server in response to a share request for the content specified by the user of the computer apparatus among contents found through the content search interface, and
display the specified content with the call screen of the VoIP call.

14. The computer apparatus of claim 13, wherein the processing circuitry is configured to provide a recommend keyword through the content search interface.

15. The computer apparatus of claim 14, wherein the processing circuitry is configured to provide the recommend keyword based on at least one of profile information set to a chatroom corresponding to the VoIP call, information on the user participating in the chatroom, a message or content sent through the chatroom, statistical information corresponding to the chatroom, and a content sharing history of the chatroom.

16. The computer apparatus of claim 13, wherein the processing circuitry is configured to display the content search interface and an interface for providing a preview related to the content to be overlaid on the call screen of the VoIP call.

17. The computer apparatus of claim 13, wherein the processing circuitry is configured to provide the content search interface for searching for content in a platform of a content provider on the call screen of the VoIP call in response to a selection on the content provider providing a content sharing service as a media type corresponding to a content sharing medium by the user input.

18. The computer apparatus of claim 13, wherein the processing circuitry is configured to further provide an interface including a preview for a screen sharing target on the call screen of the VoIP call in response to a selection on a screen share as a media type corresponding to a content sharing medium by the user input.

19. The computer apparatus of claim 13, wherein the processing circuitry is configured to display a playback screen of the specified content with the call screen of the VoIP call and display the playback screen as a single screen combined with the call screen of the VoIP call.

20. The computer apparatus of claim 13, wherein the processing circuitry is configured to generate metadata of a VoIP call packet of the VoIP call including information on the specified content as data corresponding to the share request.

* * * * *